No. 710,995. Patented Oct. 14, 1902.
N. F. PALMER.
MACHINE FOR MOLDING ARTIFICIAL STONE.
(Application filed June 26, 1902.)
(No Model.)
3 Sheets—Sheet 1.

Witnesses:
Arthur Zump.
William Schulz.

Inventor:
Noyes F. Palmer
by his attorneys
Roeder & Briere.

No. 710,995. Patented Oct. 14, 1902.
N. F. PALMER.
MACHINE FOR MOLDING ARTIFICIAL STONE.
(Application filed June 26, 1902.)
(No Model.) 3 Sheets—Sheet 2.

Witnesses:

Inventor:
Noyes F. Palmer
by his attorneys
Roeder & Briesen

THE NORRIS PETERS CO., PHOTO-LITHO., WASHINGTON, D. C.

No. 710,995. Patented Oct. 14, 1902.
N. F. PALMER.
MACHINE FOR MOLDING ARTIFICIAL STONE.
(Application filed June 26, 1902.)
(No Model.) 3 Sheets—Sheet 3.
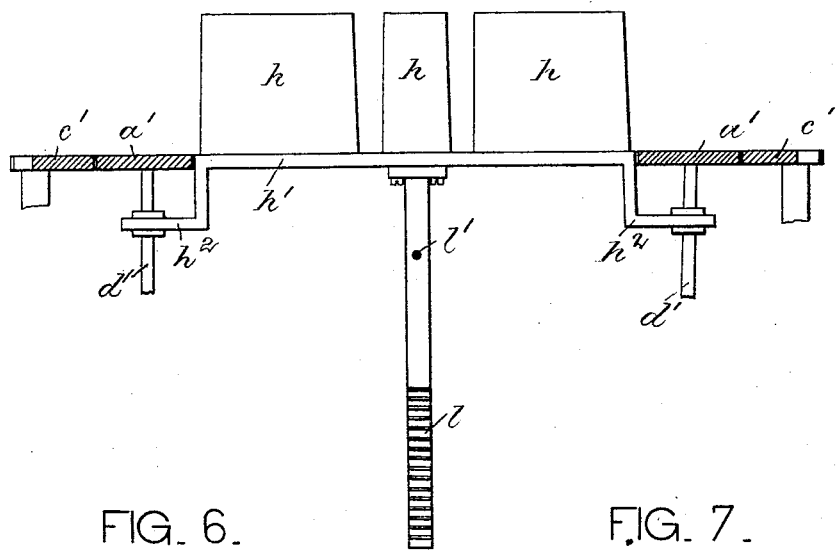
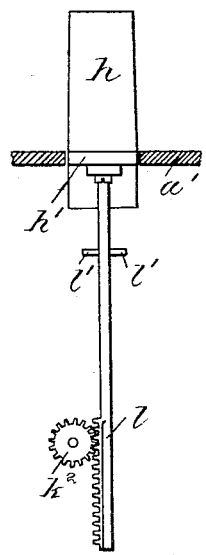
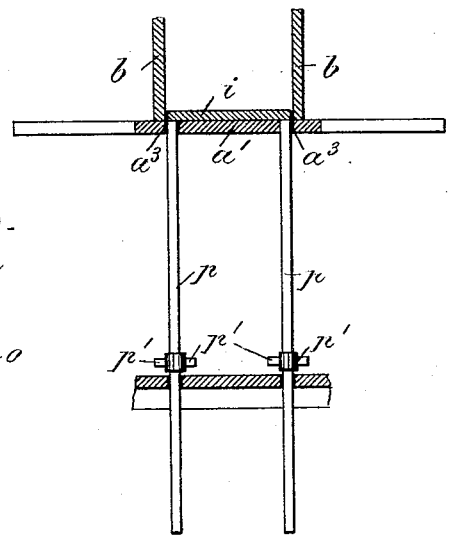
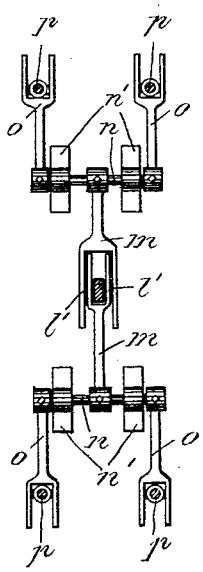
Witnesses:
Arthur Jungs.
William Schulz.
Inventor:
Noyes F. Palmer
by his attorneys
Roeder & Briesen
THE NORRIS PETERS CO., PHOTO-LITHO., WASHINGTON, D. C.

UNITED STATES PATENT OFFICE.

NOYES F. PALMER, OF BROOKLYN, NEW YORK.

MACHINE FOR MOLDING ARTIFICIAL STONE.

SPECIFICATION forming part of Letters Patent No. 710,995, dated October 14, 1902.

Application filed June 26, 1902. Serial No. 113,259. (No model.)

*To all whom it may concern:*

Be it known that I, NOYES F. PALMER, a citizen of the United States, and a resident of Brooklyn, county of Kings, and State of New York, have invented certain new and useful Improvements in Machines for Molding Artificial Stone, of which the following is a specification.

This invention relates to an improved machine for molding artificial stone which is so constructed that the operating mechanism is simple and reliable and that it is not apt to become clogged by the cement.

Figure 1:
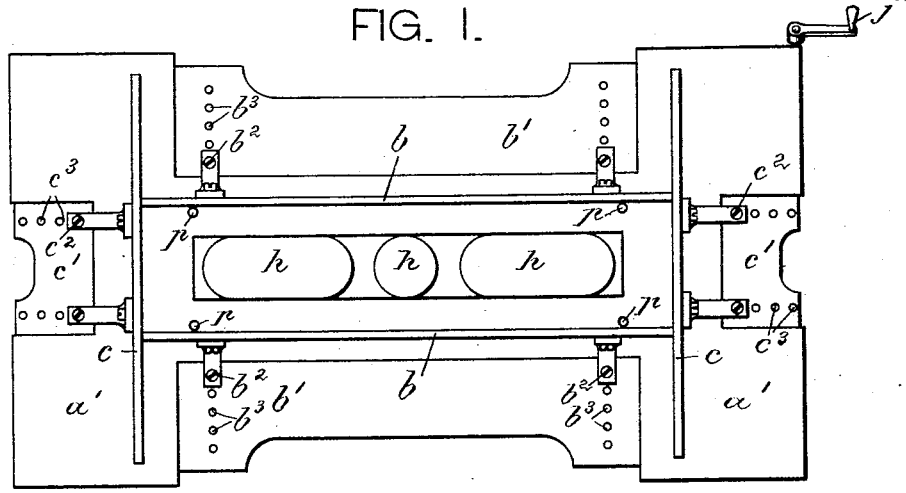
Figure 2:
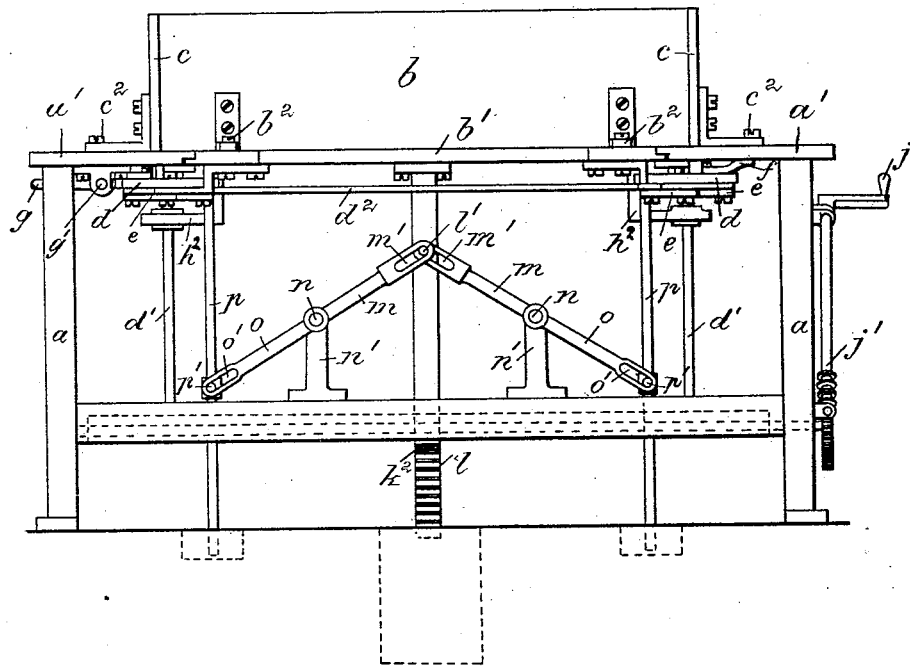
Figure 4:
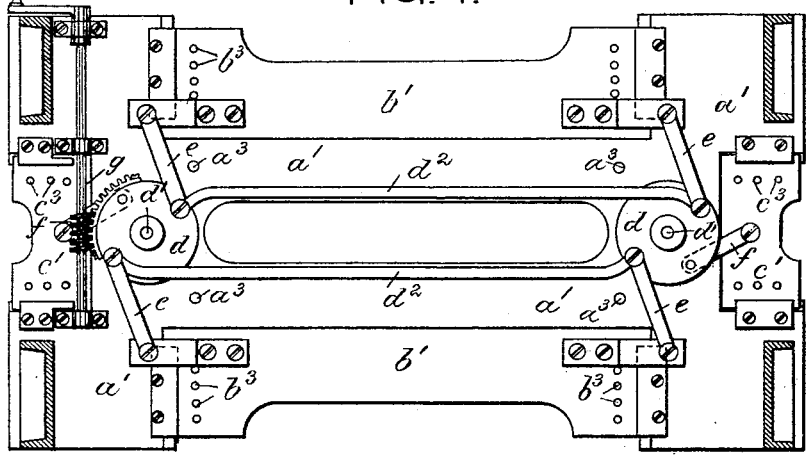
Figure 3:
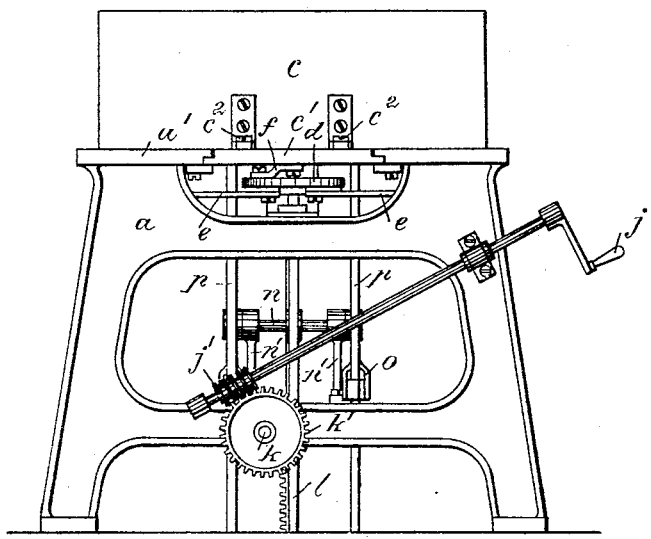

In the accompanying drawings, Figure 1 is a plan of my improved machine; Fig. 2, a side elevation; Fig. 3, an end elevation; Fig. 4, a detail of the mechanism (looking upward) for opening and closing the mold; Fig. 5, a side view of the core; Fig. 6, an end view thereof; Fig. 7, a detail of the lifters, and Fig. 8 a detail of the levers for operating the lifters.

The letter $a$ represents the frame of the machine, provided with a bed-plate $a'$, that constitutes the bottom of the mold within which the blocks are shaped. This mold is provided with sliding sides $b$ and sliding ends $c$, secured to slides $b'$ $c'$, respectively, that are guided within slots of bed-plate $a'$. The connection between the sides $b$ $c$ and slides $b'$ $c'$ is rendered adjustable by screws $b^2$ $c^2$ and a number of perforations $b^3$ $c^3$, so that the size of the mold may be altered.

The means for expanding and contracting the mold consist of a pair of disks $d$, suspended from base-plate $a'$ near each end of the mold and turning on shafts $d'$. Each of the disks $d$ is connected near its periphery to both of the slides $b'$ by pivoted links $e$ and to but one of the slides $c'$ by a pivoted link $f$. Thus each side $b$ is operated by both disks, while the ends $c$ are each operated by but a single disk. The disks are connected with each other by rods $d^2$, and one of the disks is provided with a toothed segment engaged by the worm-shaft $g$ of handle $g'$. If the handle is turned in one direction, the disks will be turned until all the links $e f$ project radially outward when the mold is open. A turning of the handle in the opposite direction folds the links and closes the mold, Fig. 4.

The advantage of the mechanism described is that it operates positively without gearing and that it is not apt to become clogged by cement. Each disk $d$ constitutes, in effect, three inner toggle-lever arms, of which the links $e e f$ are the outer arms.

To shape hollow blocks, the mold contains one or more cores $h$, mounted upon a common support $h'$, which is received within a corresponding opening of base-plate $a'$, Fig. 5. The support $h'$ is provided with bent perforated arms $h^2$, guided upon shafts $d'$. A false bottom $i$, perforated to accommodate the cores, is placed within the mold and is adapted to be raised while the cores are being lowered, so that the fresh block may be lifted clear of the mold.

The mechanism for simultaneously operating the cores and false bottom consists of a handle $j$, turning a worm-shaft $j'$, which engages worm-wheel $k'$ of shaft $k$. Upon shaft $k$ is mounted pinion $k^2$, intergeared with rack $l$, that projects downward from core-plate $h'$. The rack $l$ is provided with pins $l'$, engaging longitudinal slots $m'$ of a pair of forked inner lever-arms $m$, keyed to rock-shafts $n$, that turn in bearings $n'$. To each of the rock-shafts $n$ are connected a pair of forked outer lever-arms $o$, having longitudinal slots $o'$. These slots engage pins $p'$ of lifters $p$, that extend through perforations $a^3$ of base-plate $a'$ into engagement with the false bottom $i$. When the handle $j$ is turned in one direction, the rack $l$ will be drawn down to lower the cores, and the lifters will be simultaneously raised by the lever-arms $m$ $o$ to elevate the false bottom and raise the molded block out of the mold. When the handle is turned in the opposite direction, the cores will be raised and the false bottom lowered, so that the mold may be filled with a fresh charge.

What I claim is—

1. In a machine for molding artificial stone, the combination of a mold having sliding sides and ends, with a pair of disks, and with links that connect said disks to said sides and ends, substantially as specified.

2. In a machine for molding artificial stone, the combination of a mold having sliding sides and ends, with a pair of disks rotatably mounted near each end of the mold, links that connect said disks to said sides and ends, means for connecting the disks with each other, and means for actuating one of said disks, substantially as specified.

3. In a machine for molding artificial stone, the combination of a movable core with an actuating-rack, a movable false bottom, an actuating-lifter, and levers operatively connecting said lifter to said rack, substantially as specified.

4. In a machine for molding artificial stone, the combination of a movable core with an actuating-rack, a movable false bottom, a pair of actuating-lifters, a rock-shaft, and slotted lever-arms that connect said rock-shaft to said rack and lifters, substantially as specified.

Signed by me at New York city, New York, this 25th day of June, 1902.

NOYES F. PALMER.

Witnesses:
F. V. BRIESEN,
WILLIAM SCHULZ.